United States Patent [19]

Pocholle et al.

[11] Patent Number: 5,375,131
[45] Date of Patent: Dec. 20, 1994

[54] TUNEABLE LASER DEVICE USING A GAS ENCLOSURE OPTICAL CAVITY

[75] Inventors: Jean-Paul Pocholle, Arpajon/la Norville; Michel Papuchon, Massy; Jean-Pierre Huignard, Paris; Claude Puech, Ballainvilliers, all of France

[73] Assignee: Thomson-CSF, Puteaux, France

[21] Appl. No.: 37,552

[22] Filed: Mar. 24, 1993

Related U.S. Application Data

[62] Division of Ser. No. 620,031, Nov. 30, 1990, Pat. No. 5,222,093.

[30] Foreign Application Priority Data

Dec. 1, 1989 [FR] France .................. 89 15874

[51] Int. Cl.$^5$ ................................. H01S 3/30
[52] U.S. Cl. .............................. 372/3; 372/99
[58] Field of Search ................. 372/3, 99, 92, 72, 55

[56] References Cited

U.S. PATENT DOCUMENTS 4,933,943 6/1990 Narhi et al. .................. 372/3
5,088,096 2/1992 Pocholle et al. ............. 372/3

Primary Examiner—James W. Davie
Attorney, Agent, or Firm—Oblon, Spivak, McClelland, Maier & Neustadt

[57] ABSTRACT

A laser includes a gas enclosure placed in an optical cavity and receiving a pump beam to generate at least one first-order and one second-order Stokes wave. One of the mirrors of the cavity is transparent to wavelengths which are higher than the first-order Stokes wave.

3 Claims, 5 Drawing Sheets

TUNEABLE LASER DEVICE USING A GAS ENCLOSURE OPTICAL CAVITY

This is a division, of application Ser. No. 7/620,031, filed on Nov. 30, 1990, U.S. Pat. No. 5,222,093.

BACKGROUND OF THE INVENTION

The invention concerns a high wavelength laser device and more particularly a powerful laser tuneable at high wavelengths.

Tuneable lasers are known in the industry such as, for example, a laser based on a sapphire crystal doped with titanium which emits in a domain covering a window between 0.6 and 1.1 microns.

Devices are also known which include a Raman cell excited by a pump laser. The description of such a device can be found in French patent application no. 89 09303, filed on Jul. 11, 1989. Such a Raman cell is constituted of an enclosure containing a pressurized gas which can be hydrogen, deuterium or methane. This gas cell excited by a pump laser, for example a laser based on a sapphire crystal doped with titanium, enables a wave (Stokes wave) to be generated by non-linear interaction, whose wavelength can be tuned within a window between approximately 0.7 and 2 microns.

However certain applications may require a laser emitting at high wavelengths, such as the visible wavelengths, and tuneable in large wavelength ranges.

SUMMARY OF THE INVENTION

The invention therefore concerns a high wavelength laser, characterized by the fact that it comprises:
- a pump laser source emitting a pump beam (Fp) of a given wavelength;
- a pressurized gas enclosure in which is transmitted the pump beam (Fp), the gas contained in the enclosure being excited by the pump beam (Fp) and giving rise by the Raman effect to at least a first-order Stokes wave and a second-order Stokes wave;
- an optical cavity, comprising a first input reflection device and a second output reflection device, in which is placed the gas enclosure, the second reflection device also serving as an output mirror transparent, over at least part of its surface, to wavelengths in excess of the first-order Stokes wavelength.

The invention also concerns a high wavelength laser characterized by the fact that it comprises:
- a pump laser source emitting a pump beam (Fp) of given length;
- a pressurized gas enclosure in which is transmitted the pump beam (Fp), the gas contained in the enclosure being excited by the pump beam and giving rise by the Raman effect to the creation of at least one first-order Stokes wave and one second-order Stokes wave;
- an optical wave guide situated in the gas enclosure in the path of the pump beam, this optical wave guide being made in such a way as to select at output a Stokes wave of at least second order.

BRIEF DESCRIPTION OF THE DRAWINGS

The various objects and characteristics of the invention will appear more clearly in the following description, made as a non-restrictive example, and referring to the appended drawings, in which.

DESCRIPTION OF THE PREFERRED EMBODIMENT

The invention uses a powerful primary wave acting as a pump wave and a tank filled with a gas under high pressure in which the pump wave is made to act to create a multi-Stokes Raman process.

Figure 1:
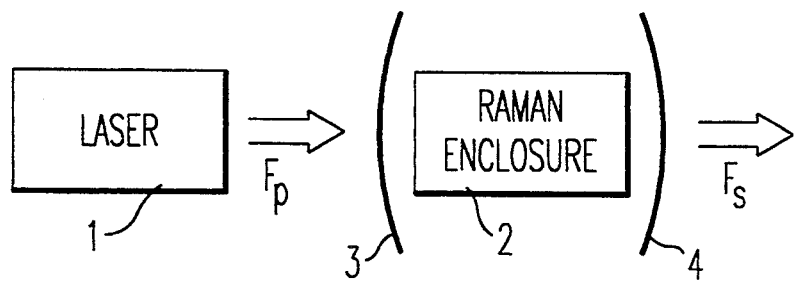
FIG. 1 is a basic representation of a mode of embodiment of the invention.

FIG. 1 therefore shows a tuneable laser 1 emitting a pump beam Fp towards an optical cavity 3, 4 in which is located a pressurized enclosure 2 filled with a gas. The mirrors 3 and 4 of the optical cavity are such that the mirror 3 allows the beam Fp to penetrate into the cavity but reflects all wavelengths towards the interior of the cavity. The mirror 4 reflects the first-order Stokes wave but lets the light beams of wavelengths exceeding that of the first order Stokes wave pass through.

As an example, the pump laser is based on a sapphire crystal doped with titanium and the Raman cell is constituted of an enclosure in which is compressed a gas which can be hydrogen, deuterium or methane.

The sapphire laser doped with titanium is known to cover the spectral domain from 0.65 $\mu$m to 1 $\mu$m continuous régime and from 0.6 $\mu$m to 1.1 $\mu$m in pulsed régime. In the latter case, a source is obtained which is perfectly suitable for the realization of non-linear interactions, among which can be mentioned the stimulated Raman effect.

The combination of a sapphire laser doped with titanium and a gas cell (such as hydrogen, deuterium or methane) enables a wave covering the window 1–9 $\mu$m to be generated by non-linear interaction. Knowing moreover that the tuneability domain of the pump laser covers the 0.6–1.1 $\mu$m window, a source is thus made which is tuneable from an extreme component of the visible to the domain of the middle infrared.

The non-linear effect is observed in solids, liquids and gases. In particular, the greatest Raman shift has been observed in pressurized hydrogen. It should be remembered that the Stokes wave generated is related to the pump wavelength and to $\Delta\sigma$ (Raman frequency shift) by the relationship:

$$\lambda_s = (\lambda_p^{-1} - \Delta\Gamma)^{-1}$$

We see therefore that any modification in the pump wavelength is accompanied by a Stokes emission at a particular wavelength. Thus, in the spectral domain covered by the pump wave, it is possible to generate wavelengths from 0.6 to 13 $\mu$m.

In the table below are cited the first two orders of Stokes wavelengths which can be obtained from the tuneability domain characterizing the emission from a pulsed sapphire laser doped with titanium. The gain coefficient is also determined as a function of the pressure and the nature of the gas filling the Raman cell. The Raman gain coefficient is obtained from the relationship:

$$g_R = \frac{16c^2 \Delta N \pi^2}{h w_s^3 \Delta w_R} \frac{\partial \sigma}{\partial \Omega}$$

In this relationship, c is the speed of light in a vacuum, $\bar{h}$ is Planck's constant/2, $\Delta N$ is the density of molecules characterizing the population inversion, between the initial and final states, participating in the Raman process of inelastic diffusion, $\omega_s$ represents the angular frequency of the Stokes wave, $\omega_R$ is the width half-way up the profile of the ray defining the Raman gain, and $\partial \sigma / \partial \Omega$ characterizes the differential efficient section of the Raman diffusion.

The gain at the Stokes frequency $\nu_s = c/\lambda_s$ is then obtained from the classic relationship:

$$G = g_R I_p L$$

where Ip is the intensity of the pump wave ($I_p = P_p A_{eff}$), L the length of interaction and $A_{eff}$ is an effective surface taking into account the overlap integrals between spatial modes at angular frequencies $\omega_s$ and $\omega_p$.

In the assembly considered, we use the Stokes wave generated by the primary pump wave, which after a certain course in the non-linear medium behaves like a new pump wave triggering a new mechanism of power transfer from this Stokes wave ($\lambda_{s1}$) towards another Stokes component located at the wavelength:

$$\lambda_{s2} = (\lambda_{s1} - \Delta \sigma)^{-1}$$

In the table below, we have therefore calculated the position of the first and second Stokes rays as a function of the nature of the Raman medium and the primary pump wavelength ($\lambda_p$).

| Lambda Pump (μm) | 1st Stokes (μm) | Gain (cm/GW) | 2nd Stokes (μm) | Gain (cm/GW) |
|---|---|---|---|---|
| Hydrogen (100 amagats) | | | | |
| 0.6 | 0.7992 | 2.416 | 1.1966 | 1.613 |
| 1.1 | 2.026 | 0.953 | 12.806 | 0.15 |
| Deuterium (100 amagats) | | | | |
| 0.6 | 0.731 | 0.471 | 0.935 | 0.368 |
| 1.1 | 1.6383 | 0.21 | 3.208 | 0.1073 |
| Methane (60 amagats) | | | | |
| 0.6 | 0.7273 | 0.966 | 0.923 | 0.7613 |
| 1.1 | 1.619 | 0.4338 | 3.07 | 0.2289 |

It should be noted that the use of hydrogen, with the extreme spectral components emitted by the sapphire pump laser doped with titanium, enables Stokes waves between 1.1966 and 12.8 μm to be generated.

One of the advantages of the pump laser lies in the fact that this type of tuneable laser can be pumped optically via a YAG:Nd laser doubled in frequency and itself pumped by diode lasers. The basic diagram of the source is therefore represented in FIG. 2 by the association of the different parts:

tuneable source pump laser
tuneable sapphire:titanium laser
Raman cell

The primary pump laser can operate in tuneable régime. The pump laser is a YAG laser doped with Nd3+ pumped by diode lasers and doubled in frequency emitting a consistent wave at 0.53 μm. In this case, the wave emitted by the sapphire laser doped with titanium 1 is in pulsed form and can be spectrally tuned using a network-type dispersive assembly constituting one of the cavity mirrors or a system of double refracting filters inserted in the cavity.

Figure 2:
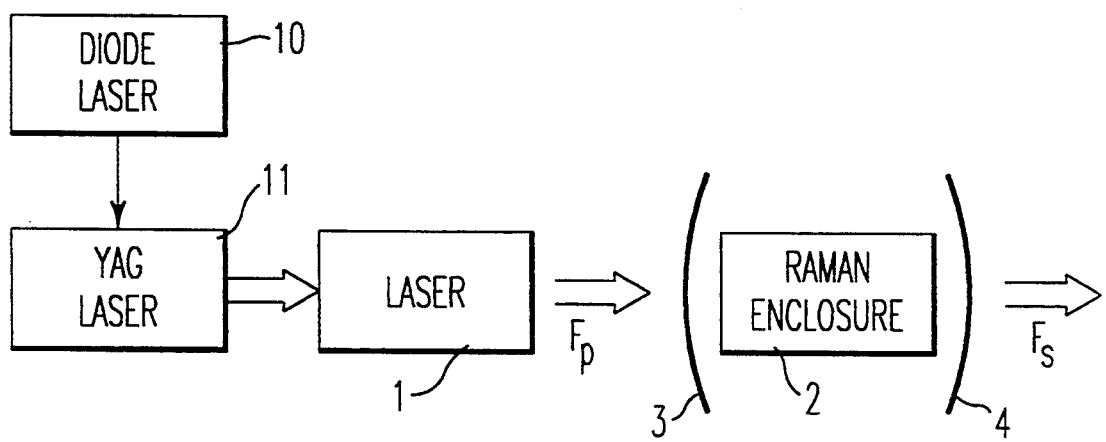
FIG. 2 is a more detailed example of an embodiment of the device of the invention.

FIG. 2 represents a detailed example of embodiment of the device of the invention. This device includes a diode laser 10 emitting a beam of wavelength 0.808 μm pumping a YAG11 crystal. The laser emission is then doubled in frequency 11 and a beam of wavelength 0.532 μm is obtained, enabling the sapphire laser 1 doped with titanium to be pumped and to emit a pump beam towards the Raman cavity 2. The Raman cavity is a pressurized gas enclosure whose faces 3 and 4 constitute the optical cavity. These faces 3 and 4 have reflecting properties such as those of the mirrors 3 and 4 in FIG. 1.

Figure 3:
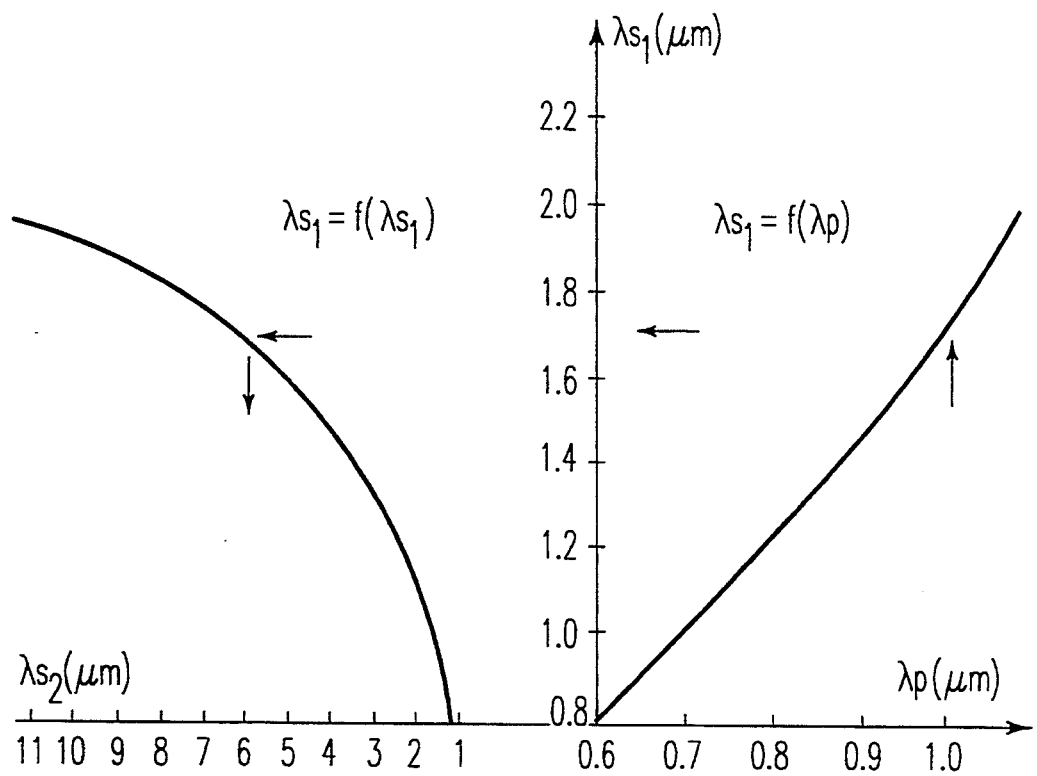
FIG. 3 represents curves explaining the operation of the device of the invention.

In FIG. 3 we have marked the position of the Stokes wavelengths emitted by a hydrogen Raman cell as a function of the pump wavelength emitted by the sapphire laser doped with titanium. At the right-hand side of the figure is obtained, from the pump wavelength emitted by a sapphire laser doped with titanium, the first-order Stokes wavelength emitted by the Raman cell. At the left of the figure is obtained, from the first-order Stokes wave, the emitted second-order Stokes wavelength. It can for example be observed that the use of a pump source centered at $\lambda p = 1$ μm generates a Stokes ray at 1.71 μm in hydrogen. This emission can itself give rise to the creation of a second Stokes ray at 5.197 μm.

Figure 4:
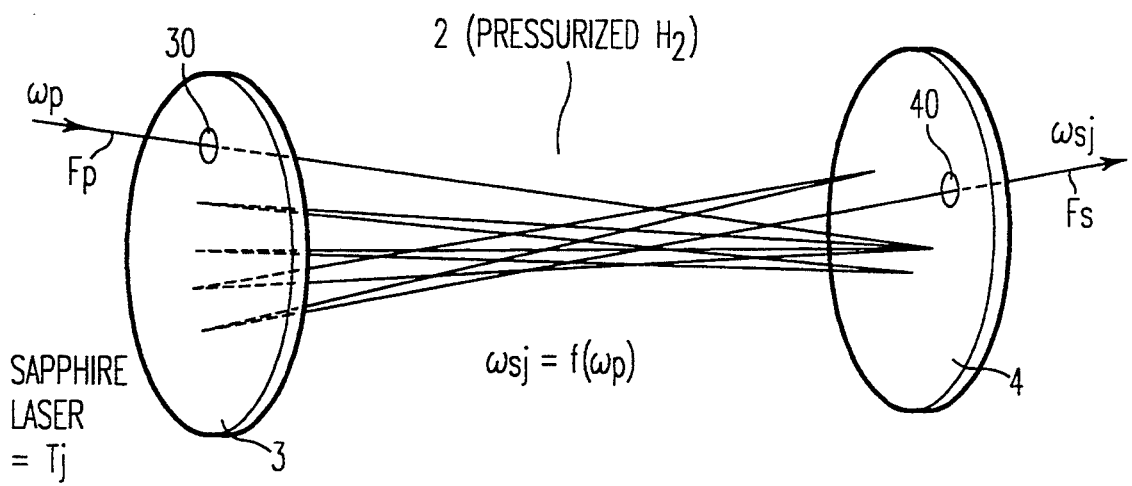
FIG. 4 represents an example of an embodiment of the optical cavity of the device represented in FIGS. 1 and 2.
Figure 5:
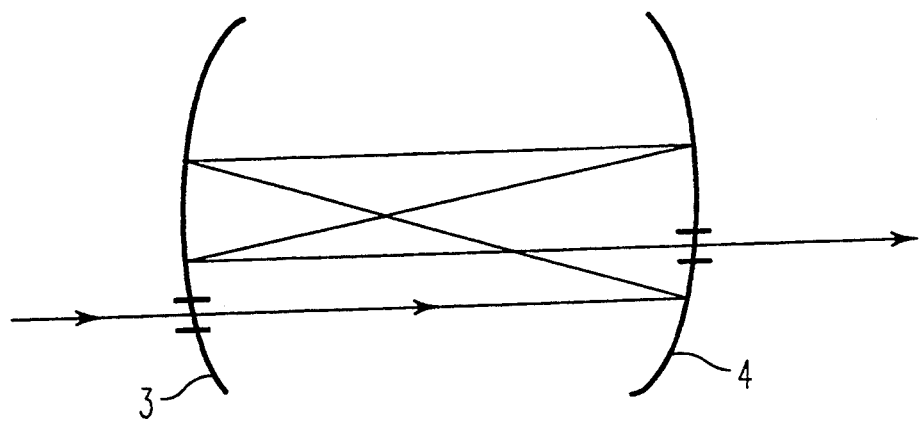
FIGS. 5 to 8 represent another example of embodiment of the optical cavity.
Figure 6:
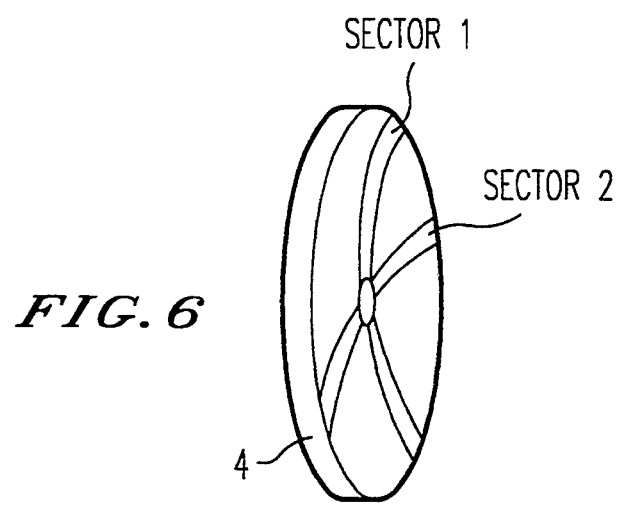

FIG. 4 represents an example of embodiment of the optical cavity 3, 4 and of the Raman cell 2.

The Raman cell placed before the primary tuneable source (sapphire laser doped with titanium) is constituted of a hermetically closed enclosure under high pressure. This cell is constituted of a cavity with two mirrors 3, 4. The first mirror 3 is highly reflective for the spectral domain between wavelengths of 0.6 μm and 13 μm. The second mirror 4 presents the same characteristics with an output opening 40. The pump wave Fp is injected via an opening 30 in the mirror 3.

The openings 30 and 40 are not both situated in the direction of the pump beam exciting the gases in the enclosure 2. The pump wave thus undergoes multiple reflections between the two mirrors 3, 4 until total depletion occurs. The use of metallized mirrors enables a multipassage achromatic system to be made. In this case, the injected pump power level must simply be modified to cover the spectral domain proper to the emission covered by the first or second Stokes order.

FIGS. 5 to 8 represent another example of embodiment of the Raman cell. The mirror 3 has the same properties as before. Only the output mirror 4 has sectors (sector 1, sector 2) of different spectral reflectivities.

Figure 7:
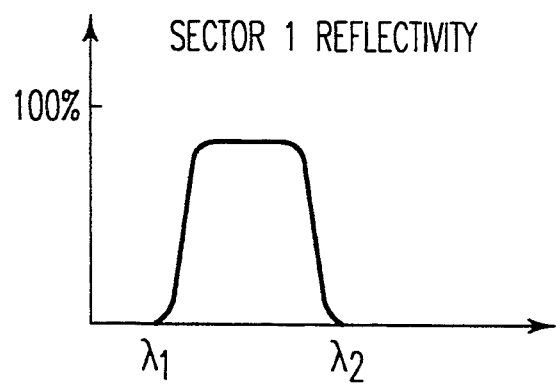
Figure 8:
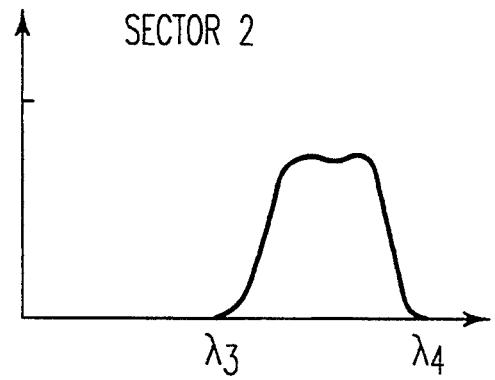

FIGS. 7 and 8 represent, as an example, diagrams of reflectivities of the sectors 1 and 2 of the mirror 4.

Thus, by a rotation of the output mirror 4, it is possible to determine the Raman component and the wavelength which can be emitted. Each radial sector enables the reflectivity to be adapted to a given spectral domain. The successive reflections are established in a plane which is retained.

The wave emitted is collinear with the pump wave and a control of the parameters of the cavity can be obtained by moving the mirror 4 with respect to the mirror 3 using an electrically-controlled mobile assembly.

The use of a true confocal cavity can also be considered.

Figure 9:
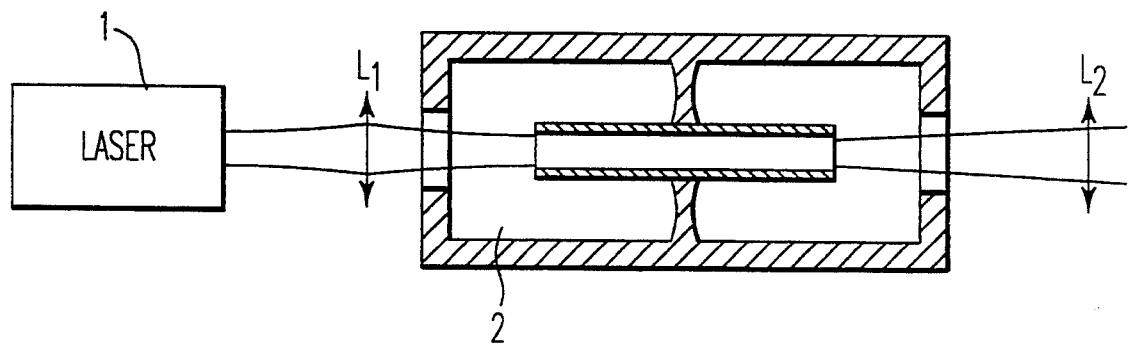
FIG. 9 represents a variant embodiment of the device of the invention.

FIG. 9 represents another mode of embodiment of the invention in which a hollow dielectric wave guide 6 is placed in the Raman cell. In this case the coupling between the $TEM_{00}$ mode of the primary pump wave and the $EH_{11}$ mode of the wave guide structure is optimized.

This hollow guide 6 is constituted either of a capillary of glass containing fluorine or a chalcogenide material, depending on the gas and the spectral domain covered, or of a metal guide. The guide is delocalized with respect to the injection window 7 constituted of a film of silica treated against reflection between 0.6 and 1.1 $\mu$m. If spectral components are required which are at great distances in the middle infrared, the output window 8 can be constituted of a film of barium fluoride ($BaF_2$). The input windows 7 and 8 do not then constitute an optical cavity in this model of embodiment.

The length of the hollow guide 6 is optimized in order to obtain at output a Stokes wave of wavelength higher than the first order. This optimization leads to a length for the hollow guide 6 of the order of a meter.

Figure 10:
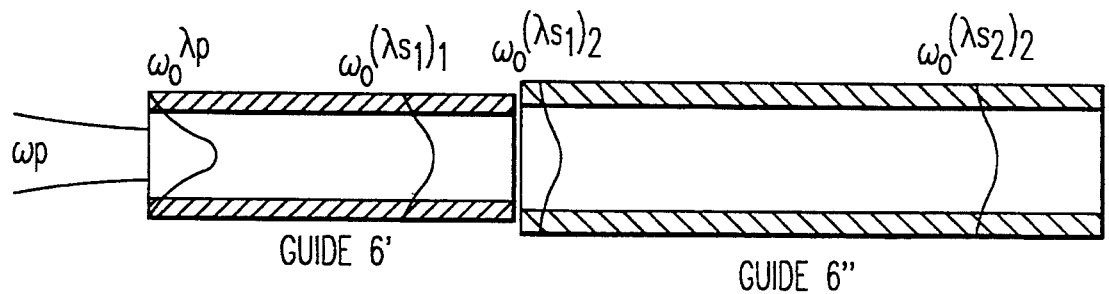
FIGS. 10 and 11 present examples of embodiment of the optical guide of the device in FIG. 9.

FIG. 10 represents a variant embodiment of FIG. 9 in which the hollow guide is made in the form of two hollow guides 6' and 6" placed end to end in the direction of the pump beam. The two guides 6' and 6" are made of different materials. The first guide 6' is of a material with low absorption in the spectral domain covered by the first Stokes (e.g. between 0.8 and 2.1 $\mu$m). The second guide 6" is made of a material which is absorbent outside the spectral domain 2.1–12 $\mu$m; it constitutes an efficient guide for waves in this spectral domain.

As an example, for these examples of wavelengths, the materials of which the guides are made are:
for the first guide 6': glass containing fluorine
for the second guide 6": tube of BeO.

The geometry of the guides 6' and 6" is also optimized to improve the conversion yield for the first and second-order Stokes waves.

For the examples given above the dimensions of the guides are as follows:
For the guide 6':
  Internal diameter: 15 $\mu$m
  Length: approx. 1 m
For the guide 6":
  Internal diameter: 100 $\mu$m
  Length: approx. 1 m Using a metal guide, it is possible to adapt a configuration with a wide spectral domain of emission. In this case an optical guide structure is used with adiabatic coupling of the mode, made using a spacing between the walls of the guide which varies linearly with distance. This enables the dimension of the mode to be modified and its monomode nature to be preserved over a wide spectral domain. An extension of this principle can be adapted to a cylindrical hollow guide using a conical capillary. The wavelength emitted can in this case be controlled via an adjustment of the pump power used.

Figure 11:
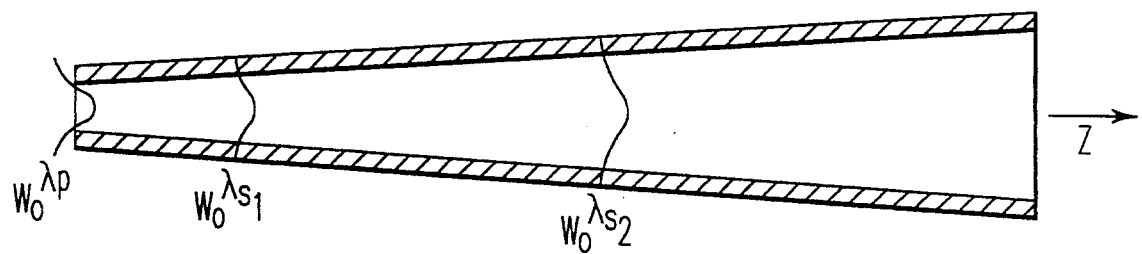

This structure is shown in FIG. 11; The dependence of the pump and Stokes powers is represented in FIGS. 12a and 12b as a function of the level of incident power at the input to the Raman guide.

Figure 12A:
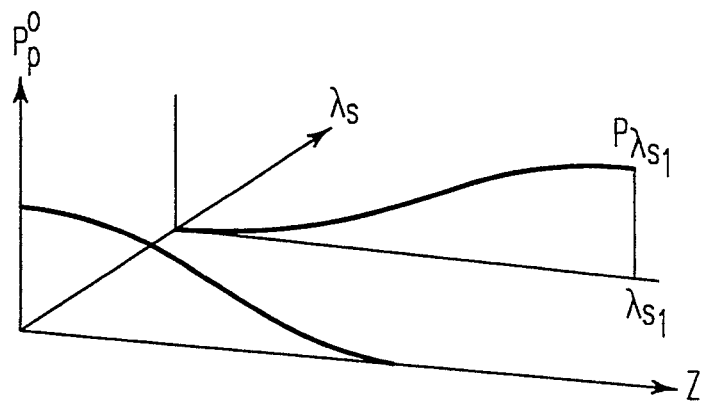
FIGS. 12a and 12b represent curves explaining the wavelength conversions.
Figure 12B:
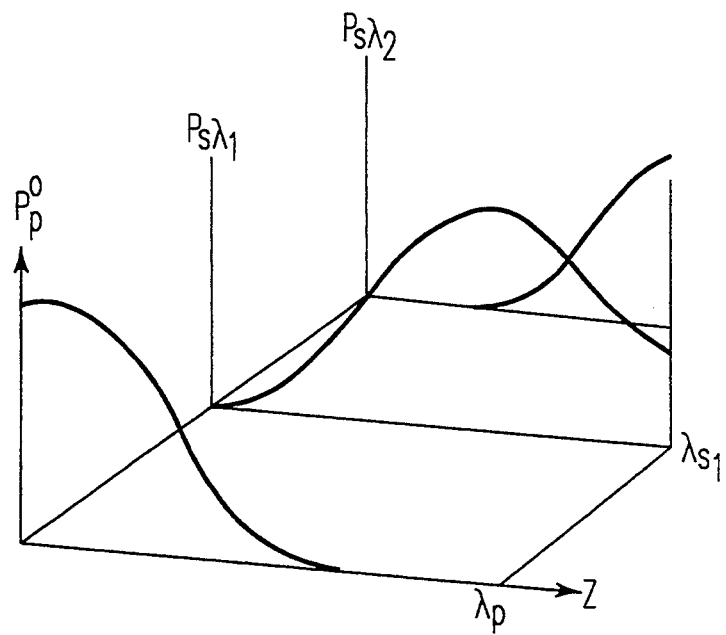

FIG. 12a is a diagram showing the conversion of a pump wave (curve Fp) into a Stokes wave $Fs_1$. FIG. 12b is a diagram showing the conversion of a pump wave (Fp) to obtain a first-order Stokes wave ($Fs_1$) and then a second-order Stokes wave ($Fs_2$).

According to the above description, the invention thus concerns a tuneable laser based on a pump laser which is itself tuneable over a spectral domain covering for example a window from 0.6 to 1.1 $\mu$m. This laser, from a Raman-type non-linear process and according to a multi-Stokes mechanism, then generates new frequencies with a spectral shift corresponding to the Raman shift of the gas used.

For example, from a sapphire laser doped with titanium and a Raman cell containing hydrogen under high pressure, it is possible to obtain an emission stretching from 0.6 $\mu$m to 1.3 $\mu$m.

Such a source has certain advantages over the other types of tuneable sources based on parametric effects (parametric oscillator):
  higher tuneability domain, from the visible to the infrared
  wider transparency domain of the Raman medium
  greater resistance to light intensity and higher optical damage threshold; in addition optical damage (optical breakdown) is not irreversible since the medium in a gaseous form is naturally regenerated
  natural phase matching, not requiring the use of a particular angle of attack and rotation of the cell. This automatic phase matching specific to the stimulated Raman effect minimizes the dependence of the non-linear interaction on temperature (with respect to variations close to the ambient temperature)
  collinear emission whatever the wavelength generated.

It is clear that the above description is a non-restrictive example and that other variants can be envisaged within the framework of the invention. The numerical examples and the nature of the materials indicated have been given only to illustrate the description.

What is claimed is:

1. A laser, comprising:
  a pump laser source emitting a pump beam of a determined wavelength;
  a pressurized gas enclosure in which is transmitted the pump beam, said gas contained in the enclosure being excited by the pump beam and giving rise by the Raman effect to at least one first-order Stokes wave and one second-order Stokes wave;
  an optical cavity, comprising a first input reflection device having a high coefficient of reflection for all wavelengths, and a second output reflection device, in which is placed said gas enclosure, said second reflection device having, over at least part of its surface, a high coefficient of reflection for the wavelengths situated outside a range including the second-order Stokes wavelength.

2. Laser according to claim 1, wherein said output reflection device possesses surfaces of different coefficients of reflectivity.

3. Laser according to claim 2, wherein said surfaces are made in the form of sectors.

* * * * *